US012783902B1

(12) United States Patent
Lopez et al.

(10) Patent No.: US 12,783,902 B1
(45) Date of Patent: Nov. 3, 2026

(54) MANAGING FEDERATED LEARNING PERFORMED ON MULTIPLE ENDPOINT DEVICES

(71) Applicant: UIPCO, LLC, San Antonio, TX (US)

(72) Inventors: Mark Anthony Lopez, Helotes, TX (US); Ric M. Pena, Boerne, TX (US); Dustin Bowen Bitter, Lehi, UT (US); Rouben Sagatelov, Highland Heights, OH (US); Megan Sarah Jennings, San Antonio, TX (US); David Michael Schlittler, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 812 days.

(21) Appl. No.: 18/334,677

(22) Filed: Jun. 14, 2023

(51) Int. Cl.
*G06N 3/098* (2023.01)
*G06N 20/00* (2019.01)
*H04L 67/10* (2022.01)

(52) U.S. Cl.
CPC ............. *G06N 3/098* (2023.01); *G06N 20/00* (2019.01); *H04L 67/10* (2013.01)

(58) Field of Classification Search
CPC ...................................................... G06N 3/098
See application file for complete search history.

(56) References Cited

U.S. PATENT DOCUMENTS

| | | | | |
|---|---|---|---|---|
| 12,289,215 | B2 * | 4/2025 | Neogi | H04L 41/145 |
| 2018/0018590 | A1 * | 1/2018 | Szeto | G06N 20/00 |
| 2020/0027019 | A1 * | 1/2020 | Yang | G06N 3/0985 |
| 2021/0374502 | A1 * | 12/2021 | Roth | G06N 3/045 |
| 2021/0406782 | A1 * | 12/2021 | Nakayama | G06F 16/27 |
| 2022/0261293 | A1 * | 8/2022 | Krishnamoorthy | G06F 11/302 |
| 2022/0405651 | A1 * | 12/2022 | Knuesel | G06N 20/20 |
| 2022/0414661 | A1 * | 12/2022 | Hassanzadeh | G06N 3/098 |
| 2023/0177349 | A1 * | 6/2023 | Balakrishnan | G06N 3/084 706/25 |
| 2023/0376859 | A1 * | 11/2023 | Miller | G06N 3/098 |
| 2024/0303504 | A1 * | 9/2024 | Xu | G06N 3/098 |
| 2025/0000361 | A1 * | 1/2025 | Soori-Arachi | A61B 5/0022 |
| 2026/0079696 | A1 * | 3/2026 | Jha | G06F 8/71 |

* cited by examiner

*Primary Examiner* — Aftab N. Khan
(74) *Attorney, Agent, or Firm* — Potomac Law Group, PLLC; Dannon G. Allbee

(57) ABSTRACT

Aspects of the present disclosure are directed to a federated learning platform that coordinates applications configured to perform federated learning on client devices in a manner that controls and manages resource usage. For example, the platform can allocate time to applications configured to perform federated learning, such as based on application priority orders, device capabilities and statuses, available time to perform federated learning, etc. The platform can further apply mechanisms to determine which applications are performing federated learning to enforce the coordination, and allow applications to share training time, training data, or machine learning models that produce similar results. In some implementations, the federated learning platform can provide controls to users to understand and limit the federated learning that is being performed on the devices, such as via a user interface dashboard.

20 Claims, 10 Drawing Sheets

MANAGING FEDERATED LEARNING PERFORMED ON MULTIPLE ENDPOINT DEVICES

TECHNICAL FIELD

The present disclosure is directed to a federated learning manager that coordinates and controls resource allocation to applications performing federated learning on endpoint devices.

BACKGROUND

Federated learning has become an increasingly popular method of machine learning, in which a central model is located on a remote server. The remote server can send instances of the central model to client devices, with the client devices at least partially training the instances using locally stored or collected data. The client devices can send the partially trained models back to the remote server, which can combine the instances (e.g., by aggregating node weights of the machine learning model), to produce an overall trained model, without exposing potentially sensitive or identifying user data.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
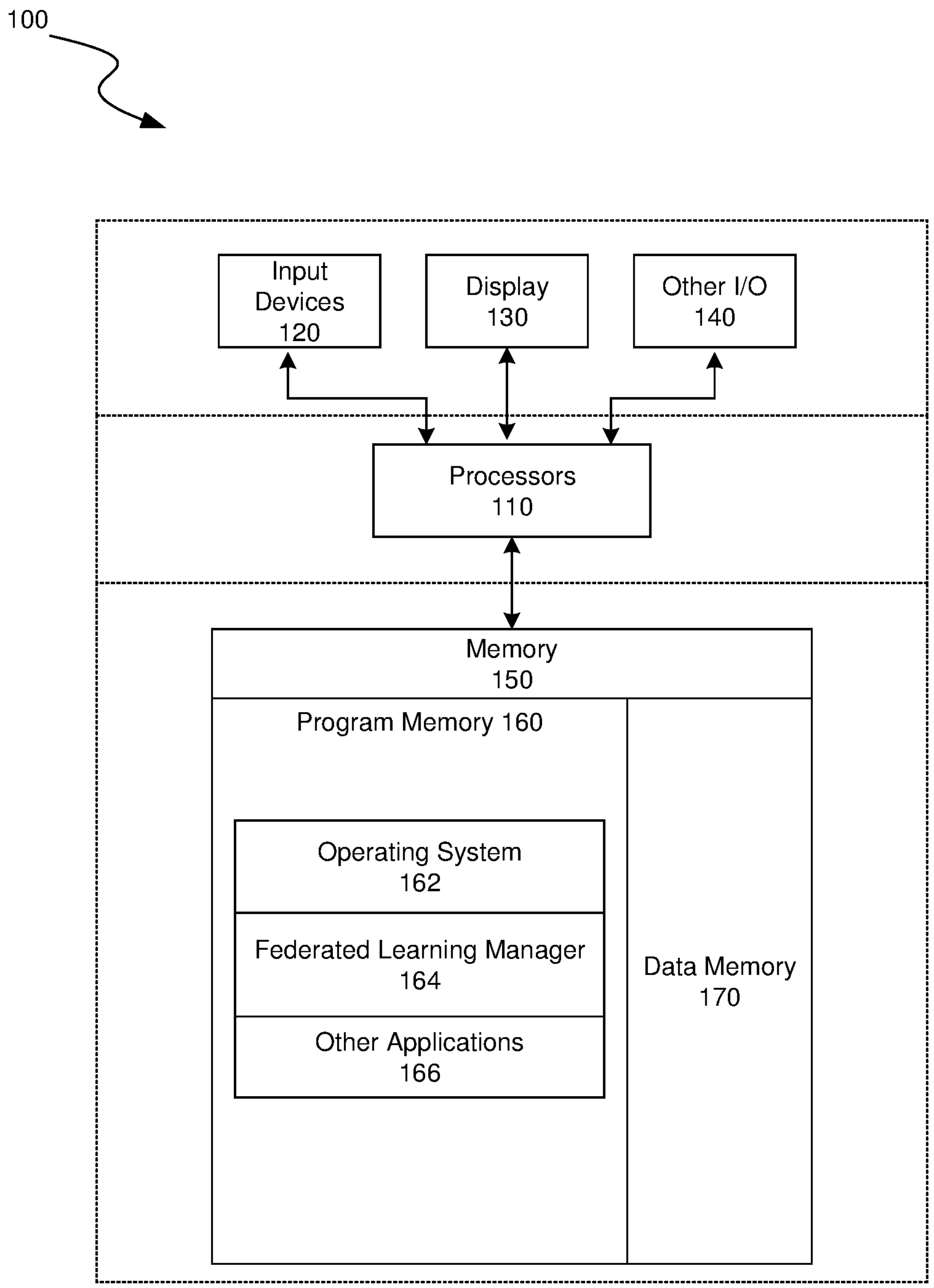
FIG. 1 is a block diagram illustrating an overview of devices on which some implementations can operate.

Aspects of the present disclosure are directed to a federated learning platform that can coordinate applications configured to perform federated learning on endpoint devices in a manner that controls and manages resource usage. For example, the platform can allocate time to the applications configured to perform federated learning, such as based on application priority orders, device capabilities and statuses, available time to perform federated learning, etc. The platform can further apply mechanisms to determine which applications are performing federated learning to enforce the coordination, and allow applications to share training time, training data, or machine learning models that produce similar results. In some implementations, the federated learning platform can provide controls to users to understand and limit the federated learning that is being performed on the devices, such as via a user interface dashboard. For example, the dashboard can allow users to visualize what applications are performing federated learning, how many resources the federated learning is consuming, controls to turn off federated learning for certain applications, and/or controls to set priority amongst applications wanting to perform federated learning. In some implementations, the dashboard can be implemented on an endpoint device having multiple applications performing federated learning, while in other implementations, the dashboard can be implemented on a central device managing federated learning on multiple endpoint devices.

As used herein, an "endpoint device" and the like can be any user or client device configured to perform federated learning for installed applications and, in some implementations, can communicate with other endpoint devices and/or with a central device via a wired or wireless local network, such over Wifi, Bluetooth or Bluetooth Low Energy (LE), near field communication (NFC), etc. To perform the federated learning, the endpoint device can, in some implementations, collect data and train or retrain machine learning models provided by a developer computing system, without providing the collected data directly to the developer computing system. A "central device" and the like can be any device configured to communicate with endpoint devices. In some implementations, the central device can itself be an endpoint device, and/or can be a hub or router for endpoint devices. In some implementations, the central device can be a device having certain advantages over other endpoint devices, such as a device having higher processing speed, lower latency, lower usage, higher availability, improved power capabilities (e.g., plugged into an outlet instead of on battery power), greater storage, increased random access memory (RAM), etc., than other endpoint devices.

A "developer computing system" can be a server or set of servers (or other central computing systems) located remotely from endpoint devices collecting data for applications provided by the developer computing system. The developer computing system can be configured to train a global or master machine learning model using federated learning, in which the developer computing system is not exposed to end user data collected by endpoint devices. A "peer ecosystem" can be a local network of endpoint "local" devices or central devices, such as collocated endpoint devices, e.g., in a particular household, office, classroom, or other location; endpoint devices on the same local network (e.g., using the same WiFi); and/or the like.

The implementations described herein provide specific technological improvements in the field of machine learning. By allowing endpoint devices to themselves retrain and/or update machine learning models, remote computing systems outside the control of the endpoint devices do not need access to data collected by endpoint devices, which could be potentially sensitive, personally identifying, or private. In addition, the collected data does not need to be stored outside of the endpoint devices, improving data security. Further, by preventing transmission of collected data outside of a local network, end-to-end network security between endpoint devices and remote computing systems (e.g., developer computing systems) is improved. In addition, in some implementations, by performing the federated learning on a selected central device within a peer ecosystem, energy can be conserved on lower capability endpoint devices, in addition to improvements in processing speed and latency in generating federated learning metrics and implementing federated learning controls. Further, by providing such controls and implementing constraints on resources based on such controls, resource usage can be optimized by, for example, preventing applications from performing federated learning at the same time, at peak device usage times, at times of low resource availability, etc.

Several implementations are discussed below in more detail in reference to the figures. FIG. 1 is a block diagram illustrating an overview of devices on which some implementations of the disclosed technology can operate. The devices can comprise hardware components of a device 100 that can manage federated learning by multiple applications on one or more endpoint devices. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, federated learning manager 164, and other application programs 166. Memory 150 can also include data memory 170, e.g., application data, training data, model data, collected data, device data, resource usage data, metrics, user control data, user interface data, rendering data, dashboard data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
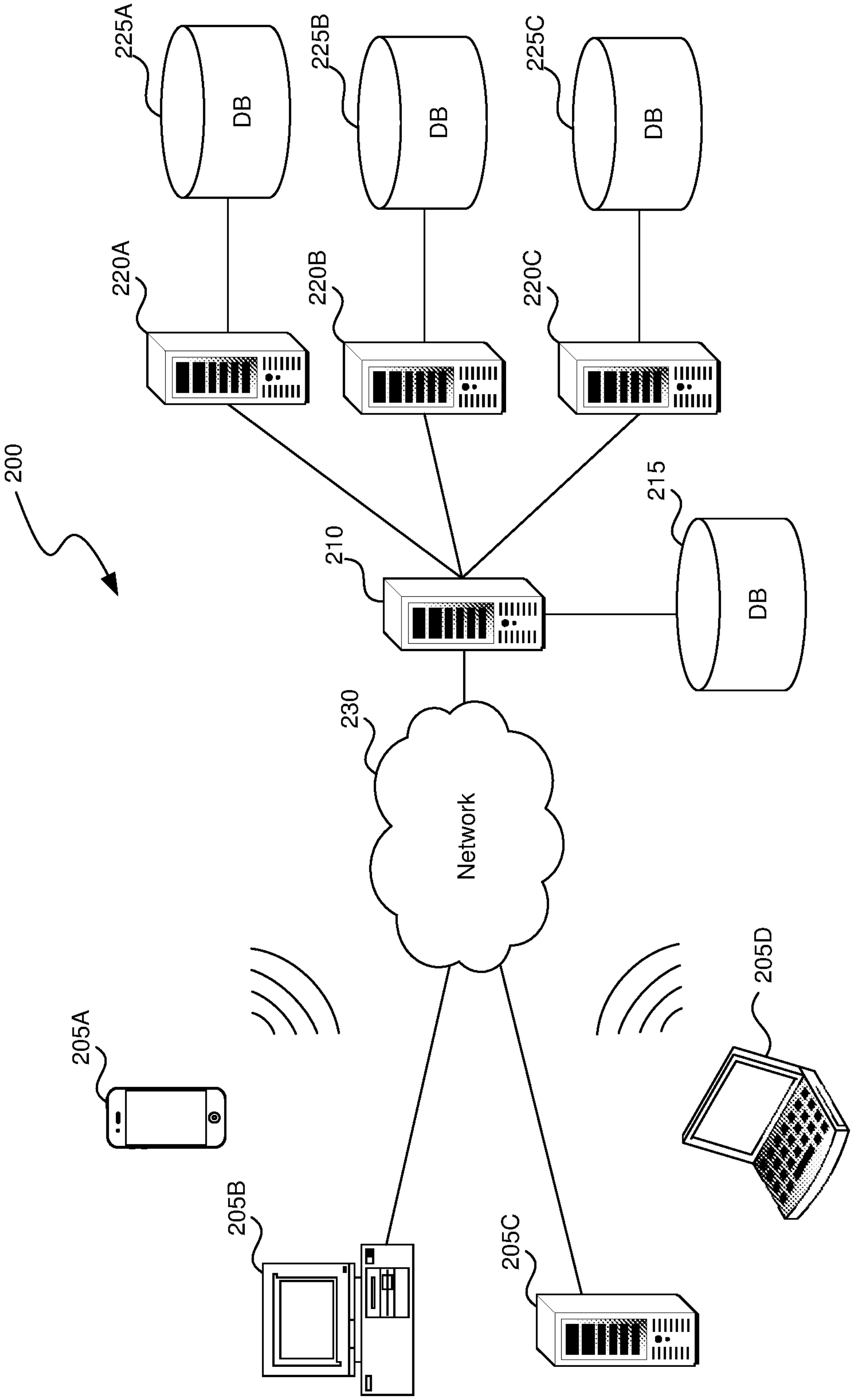
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as application data, training data, model data, collected data, device data, resource usage data, metrics, user control data, user interface data, rendering data, and dashboard data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
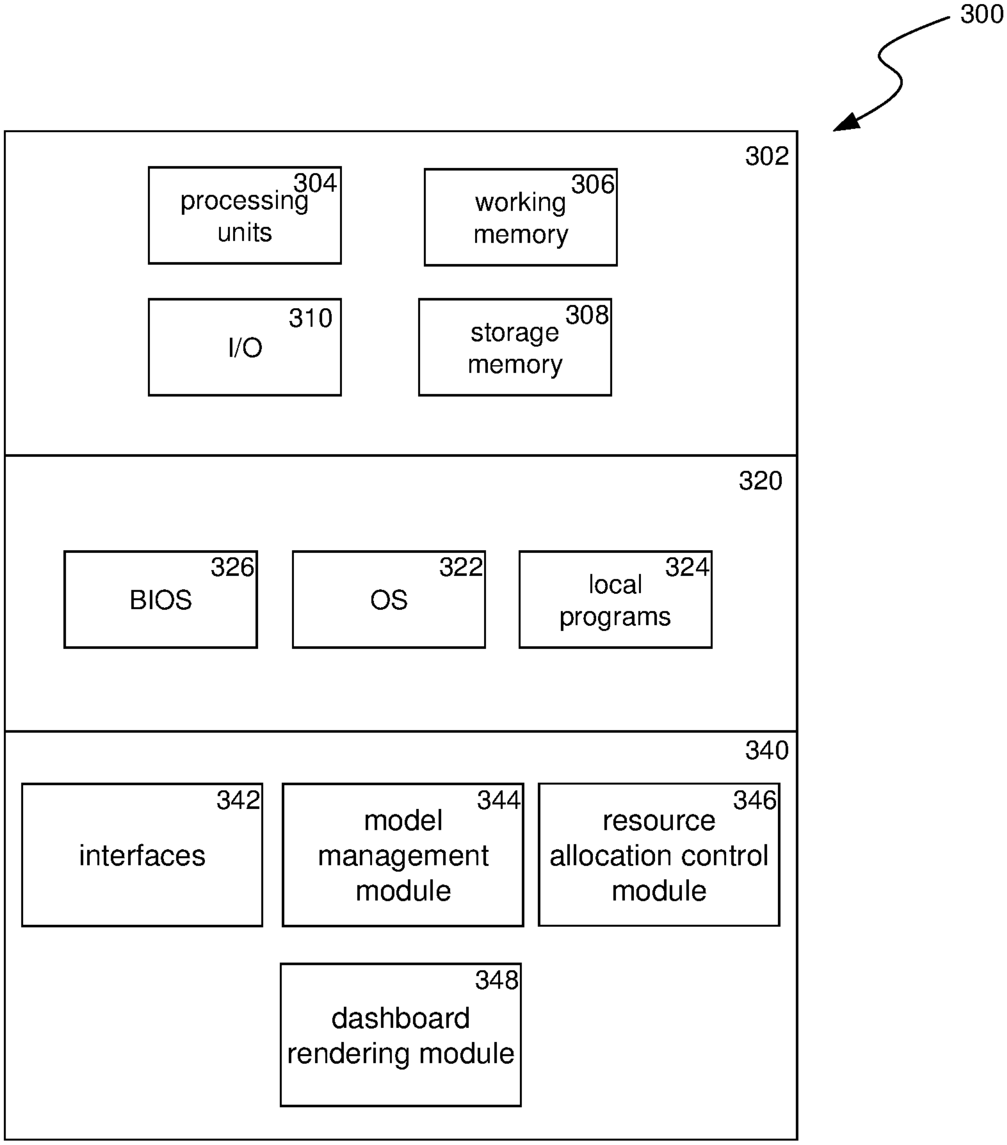
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include model management module 344, resource allocation control module 346, dashboard rendering module 348, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Model management module 344 can manage machine learning models received from respective developer computing systems. The developer computing systems can provide or manage respective applications having capabilities to perform federated learning on endpoint devices using the machine learning models. In some implementations, model management module 344 can analyze the machine learning models to determine what type of data they collect or access, what type of predictions they make, their training times, etc., in order to manage when and how they are performed, as described further herein. The machine learning models can be trained, at least partially, via federated learning by aggregating parameters from multiple endpoint devices. The parameters can be generated by the endpoint devices based on local datasets collected by applications installed on the endpoint devices, then transmitted to the respective developer computing systems to update the machine learning models. Thus, via federated learning, the developer computing system is not exposed to the actual datasets collected by the endpoint devices. Further details regarding managing machine learning models from respective developer computing systems are described herein with respect to block 402 of FIG. 4 and FIG. 5.

Resource allocation control module 346 can control resource allocation to the applications having capabilities to perform the federated learning on the endpoint devices. In some implementations, resource allocation control module 346 can select a subset of the applications to perform the federated learning based on one or more constraints or contextual factors, such as user controls, metrics, training time, features of the machine learning models, features of the applications, features of the endpoint devices, etc. In some implementations, resource allocation control module 346 can further allocate or adjust resources based on one or more of such constraints or contextual factors. The subset of the applications can perform the federated learning by generating retrained instances of respective machine learning models using data collected by the endpoint devices. The collected data can include, for example, usage data for an endpoint device or application, user data relative to the endpoint device or application, contextual data (e.g., environmental data, time of usage of an endpoint device or application, etc.), and/or the like. Further details regarding controlling resource allocation to applications having capabilities to perform federated learning on endpoint devices are described herein with respect to block 404 of FIG. 4.

Dashboard rendering module 348 can render a user interface dashboard element, which, in some implementations, can provide one or more user controls for managing the federated learning. For example, dashboard rendering module 348 can render controls for changing an application priority order for performing federated learning, for blocking an application from performing federated learning, for limiting the amount of resources (e.g., processing power, battery power, etc.) dedicated to performing federated learning, for limiting collection of data or particular data when performing federated learning, etc. In some implementations, dashboard rendering module 348 can render metrics regarding performance of the federated learning. For example, dashboard rendering module 348 can render a duration of time that federated learning was or is being performed, how much processing power is or was being used to perform federated learning, how much power has been or was consumed while performing federated learning, etc. In some implementations, resource allocation control module 346 can control resource allocation based on one or more of such user controls or user metrics. Further details regarding rendering a user interface dashboard element providing user controls for managing federated learning are described herein with respect to block 406 of FIG. 4 and FIG. 10.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
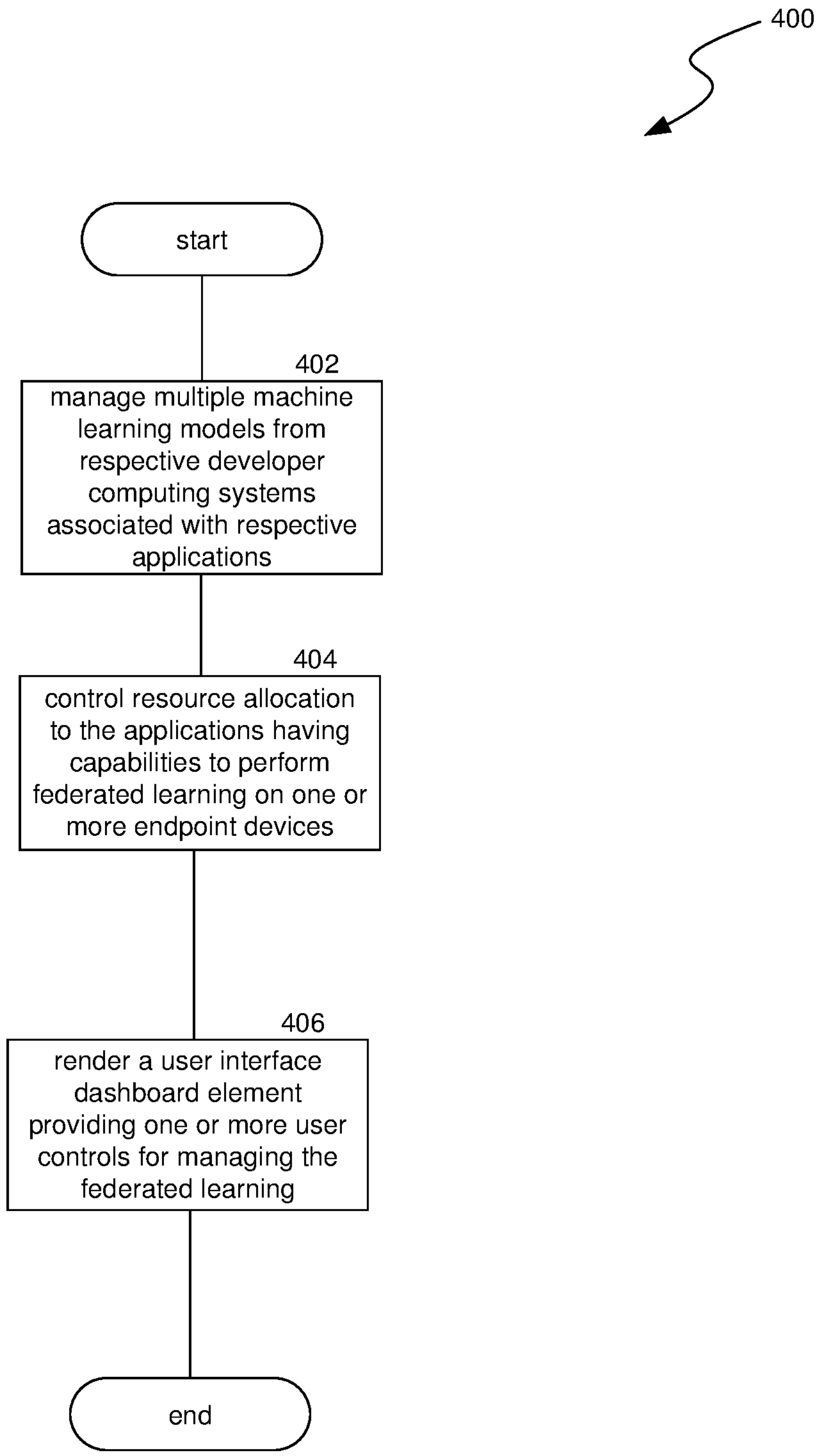
FIG. 4 is a flow diagram illustrating a process used in some implementations for managing federated learning by multiple applications on one or more endpoint devices.

FIG. 4 is a flow diagram illustrating a process 400 used in some implementations for managing federated learning by multiple applications on one or more endpoint devices. In some implementations, process 400 can be performed as a response to one or more requests to perform federated learning by one or more applications installed on one or more endpoint devices. In some implementations, process 400 can be performed as a response to a user request to manage federated learning being performed or requested to be performed by one or more applications installed on one or more endpoint devices. In some implementations, process 400 can be performed by a federated learning manager on an endpoint device to manage application(s) capable of performing federated learning on the endpoint device. In some implementations, the endpoint devices can include an IoT device, a vehicle, a computing device (e.g., a desktop or laptop computer), a mobile device (e.g., a tablet, a mobile phone, etc.), a wearable device, a smart device, a sensor, a gaming system, a television, a speaker, a WiFi router, or any combination thereof.

In some implementations, process 400 can be performed on a federated learning manager on a central device in operable communication with one or more endpoint devices having application(s) capable of performing federated learning. In some implementations, the central device can have certain advantages over other endpoint devices, such as a device having higher processing speed, improved latency, lower usage, higher availability, improved power capabilities (e.g., plugged into an outlet instead of on battery power), greater local storage, increased random access memory (RAM), etc., than other endpoint devices. In some implementations, process 400 can select the central device to manage federated learning being performed on the endpoint devices based on one or more of such advantages. In some implementations, the central device can be a computing system (e.g., a desktop or laptop computer), a tablet, a mobile phone, an Internet-of-Things (IoT) hub, a WiFi router, a gaming system, a smart television, etc.

In some implementations, the one or more endpoint devices and/or the central device can be part of a peer ecosystem. The peer ecosystem can be a local network of endpoint devices, such as collocated endpoint devices (e.g., in a room, in a household, in an office, in a classroom, in a school, in a business, etc.), that can access the same local network (e.g., using the same WiFi), and, in some implementations, are able to communicate with each other directly or via another endpoint device, such as a central device (e.g., a hub, router, etc.). In some implementations, the endpoint devices within the peer ecosystem can communicate via at least one of Bluetooth, near field communication, a mesh network, WiFi, a cellular network, or any combination thereof.

At block 402, process 400 can manage multiple machine learning models from respective developer computing systems. Each developer computing system can be, for example, a server or set of servers (or other primary computing system) located remotely from the one or more endpoint devices and/or the central device. In some implementations, each developer computing system can be associated with an application of multiple applications installed on one or more endpoint devices. In other words, a developer computing system can be a system providing, managing, and/or communicating with the application installed on an endpoint device.

The applications can have capabilities to perform federated learning on one or more endpoint devices, using respective machine learning models. The machine learning models can be trained on parameters aggregated from multiple endpoint devices, which, in some implementations, can be within multiple peer ecosystems. For example, a machine learning model can be trained on parameters aggregated from many or all of the endpoint devices having a corresponding application installed, such as on the endpoint devices whose respective users provide permission to perform federated learning on their endpoint devices. In some implementations, the parameters can be weights applied to nodes of the machine learning model.

In some implementations, the multiple endpoint devices can generate the parameters based on one or more local datasets collected by applications. The local datasets can include data such as user data associated with users using the endpoint devices (e.g., demographics data, household data, etc.), usage data by users of the endpoint devices (e.g., when, for how long, and/or how the endpoint devices are being used), contextual data surrounding usage of the endpoint devices (e.g., time of day or year that the endpoint devices are used, where the endpoint devices are used, etc.), environmental data (e.g., conditions under which the endpoint devices are used, e.g., when there is low ambient light), feedback data, etc., which can be used to train the machine learning models. In some implementations, the local datasets can be relative to specific applications, e.g., when, how, and/or how long a particular application is used and in what context, which can be used to train the machine learning models. In some implementations, the machine learning models can be executed on the endpoint devices to apply predicted actions on the endpoint devices, and the endpoint devices can collect implicit or explicit feedback about the predicted actions. The endpoint devices can then use such feedback data to train the machine learning models.

At block 402, process 400 can control resource allocation to the applications having capabilities to perform the federated learning on the one or more endpoint devices. In some implementations, controlling resource allocation to the application can be based, at least partially, on an application priority order. In some cases, process 400 can set the application priority order from a user request to set or change the priority order (e.g., via a user interface dashboard element as described further herein). In some cases, process 400 can set the application priority order based on one or more contextual factors, such as which application is typically used at a particular time of the day, on a particular day, under particular circumstances (e.g., one application is typically used after another application), etc. In some implementations, controlling resource allocation to the application can include assigning timeslots for performing the federated learning to the applications. For example, process 400 can assign earlier timeslots and/or longer timeslots to applications being higher in the application priority order, can assign timeslots based on user selections of timeslots received via a user interface dashboard element described herein, can assign timeslots based on when applications and/or endpoint devices are typically used, can assign timeslots based on resource availability, etc.

In some implementations, controlling resource allocation to the application can be based, at least partially, on capabilities of the one or more endpoint devices. For example, process 400 can allocate more resources for performing federated learning to an application installed on an endpoint device having high processing power or when the battery is above a threshold level, while allocating less or no resources for performing federated learning to an application installed on an endpoint device having low processing power or when the batter is below the threshold level. In some implementations, controlling resource allocation to the application can be based, at least partially on, respective statuses of the one or more endpoint devices (e.g., active, inactive, in use, in sleep mode, display on, display off, etc.). In some implementations, controlling resource allocation to the application can be based, at least partially, on available time for the applications to perform the federated learning. For example, a user can set, via a user interface dashboard element described herein, a timeframe or duration in which federated learning can be performed by a particular application. If that application requests to perform federated learning outside of that timeframe, process 400 can lower or provide no resources to the application to perform the federated learning.

In some implementations, controlling the resource allocation can include selecting a subset of the applications to perform federated learning. Although described herein as a "subset," it is contemplated that any number of one or more of the applications installed on any number of the one or more endpoint devices can be selected to perform federated learning. The subset of the applications can perform the federated learning by generating retrained instances of respective machine learning models and/or updating the parameters of respective machine learning models using data collected by the one or more endpoint devices.

Similar to the datasets used to generate the parameters of the machine learning models provided to the one or more endpoint devices by the developer computing system, the data collected by the one or more endpoint devices can include user data associated with users using the endpoint devices (e.g., demographics data, household data, etc.), usage data by users of the endpoint devices (e.g., when, for how long, and/or how the endpoint devices are being used), contextual data surrounding usage of the endpoint devices (e.g., time of day or year that the endpoint devices are used, where the endpoint devices are used, etc.), environmental data (e.g., conditions under which the endpoint devices are used, e.g., when there is low ambient light), feedback data, etc., specific to the one or more endpoint devices and/or to the applications installed on the one or more endpoint devices.

In some implementations, the one or more endpoint devices can collect particular data and/or types of data once for the subset of applications performing the federated learning. For example, although the machine learning models for different applications may be different, they may use at least a subset of the same data for retraining. Thus, the one or more endpoint devices can collect the data once for all applications using the common data and provide the common data to those applications to retrain the respective machine learning models.

In generating the retrained instances of the machine learning models, the one or more endpoint devices can update the parameters, on which the machine learning model was trained, based on the collected data. Thus, the retrained instances of the machine learning models can be versions of the models refined for the one or more endpoint devices. In some implementations, the retrained instances of the machine learning models can be used to personalize services provided by the one or more endpoint devices, such as to suggest, target, or streamline information, to cause changes in a user's environment (e.g., activate or deactivate IoT devices), etc. Further details regarding applying updating a trained machine learning model are described herein with respect to FIG. 9.

In some implementations, while generating the retrained instances of the respective machine learning models (i.e., while performing federated learning), process 400 can obtain metrics related to the performing of the federated learning by the subset of the applications. The metrics can include, for example, how quickly the federated learning is being performed, what data is being collected, a CPU usage of an application performing the federated learning, a time in which the federated learning is being performed, etc. In some implementations, process 400 can adjust the resource allocation based, at least partially, on the metrics related to the performing of the federated learning. For example, if a particular application is using a high percentage of CPU to perform federated learning in the background, interfering with the performance of higher priority processes or applications on an endpoint device, process 400 can lower the resource allocation to the particular application and/or to the federated learning.

In some implementations, the one or more endpoint devices performing the federated learning can transmit updated model data to the developer computing system. In some implementations, the one or more endpoint devices can transmit the updated model data to the developer computing system via a federated learning tower. The federated learning tower can be, for example, a base station receiving the updated model data, and aggregating the updated model data with other updated model data received from one or more other endpoint devices and/or endpoint device peer ecosystems. In some implementations, the one or more other endpoint devices can be within a threshold distance of the one or more endpoint devices, e.g., can be in a same local geographical area as the one or more endpoint devices, but are not networked with the one or more endpoint devices.

The updated model data can include at least one of A) the retrained instance of the global machine learning model, B) the updated parameters, or C) both. The developer computing system can then update the machine learning model based on the updated model data. In some implementations, the updated model data does not include the data collected by the one or more endpoint devices. Thus, the endpoint devices can retain control of their collected data, which could be sensitive, personal, or identifying, while still allowing the developer computing system to refine its global machine learning model.

In some implementations, process 400 can provide one or more mechanisms for communicating selected data relative to the federated learning between multiple applications. For example, the selected data can include the machine learning models received by the platform computing systems, training time for the retrained instances of the machine learning models, training data collected by the one or more endpoint devices for generating the retrained instances of the machine learning models, the retrained instances of the machine learning models, updated parameters for the retrained instances of the machine learning models, or any combination thereof. In some implementations, process 400 can provide the one or more mechanisms for communicating between multiple applications on the same endpoint device, e.g., by acting as an intermediary between the multiple applications to allow the applications to communicate via the federated learning manager. In some implementations, process 400 can provide the one or more mechanisms for communicating between multiple applications (which can be the same or different) on different endpoint devices, e.g., by a central device acting as an intermediary between applications on different endpoint devices to allow them to communicate via the federated learning manager on the central device.

At block 406, process 400 can render a user interface dashboard element related to the federated learning. In some implementations, the user interface dashboard element can identify the endpoint device(s) approved and/or available for federated learning, the application(s) on the endpoint device (s) capable of performing the federated learning, which application(s) are currently performing federated learning, etc. In some implementations, the user interface dashboard element can identify any metrics collected by process 400 related to the performance of the federated learning. For example, the user interface dashboard element can display how long the federated learning ran or has been running, a current or average CPU being consumed, when the federated learning started or ended, types of data collected by the federated learning, etc.

In some implementations, the user interface dashboard element can provide one or more user controls for managing the federating learning. The user controls can allow a user to, for example, disable or limit particular applications from performing federated learning on an endpoint device, disable or limit particular machine learning models from being run on an endpoint device, limit the type(s) and/or amount(s) of data collected by an application during federated learning, limit the time that an application can perform federated learning (e.g., to a duration of time or to a certain time slot), limit the amount of CPU that can be spent on performing federated learning either in general or per application, limit the performance of federated learning based on particular conditions (e.g., when a particular application is being actively used, when the endpoint device is plugged into a power source, when the endpoint device has high battery power, when the endpoint device has high CPU availability, when the endpoint device has available storage, etc.). In some implementations, process 400 can adjust the resource allocation, at least partially, on the one or more user controls for managing the federated learning. For example, based on selection of a user control blocking an application from performing federated learning, process 400 can lower the CPU percentage allocated to the particular application and/or eliminate CPU usage on federated learning for the application. An exemplary user interface dashboard element is shown and described herein with respect to FIG. 10.

In some implementations, process 400 can end when a user or system terminates the federated learning manager on an endpoint device or central device. In some implementations, process 400 can end when a user or system terminates the applications capable of performing the federated learning. In some implementations, process 400 can when an endpoint device or central device executing the federated learning manager is deactivated or powered off. In some implementations, process 400 can end when federated learning is no longer being performed on one or more endpoint devices.

Figure 5:
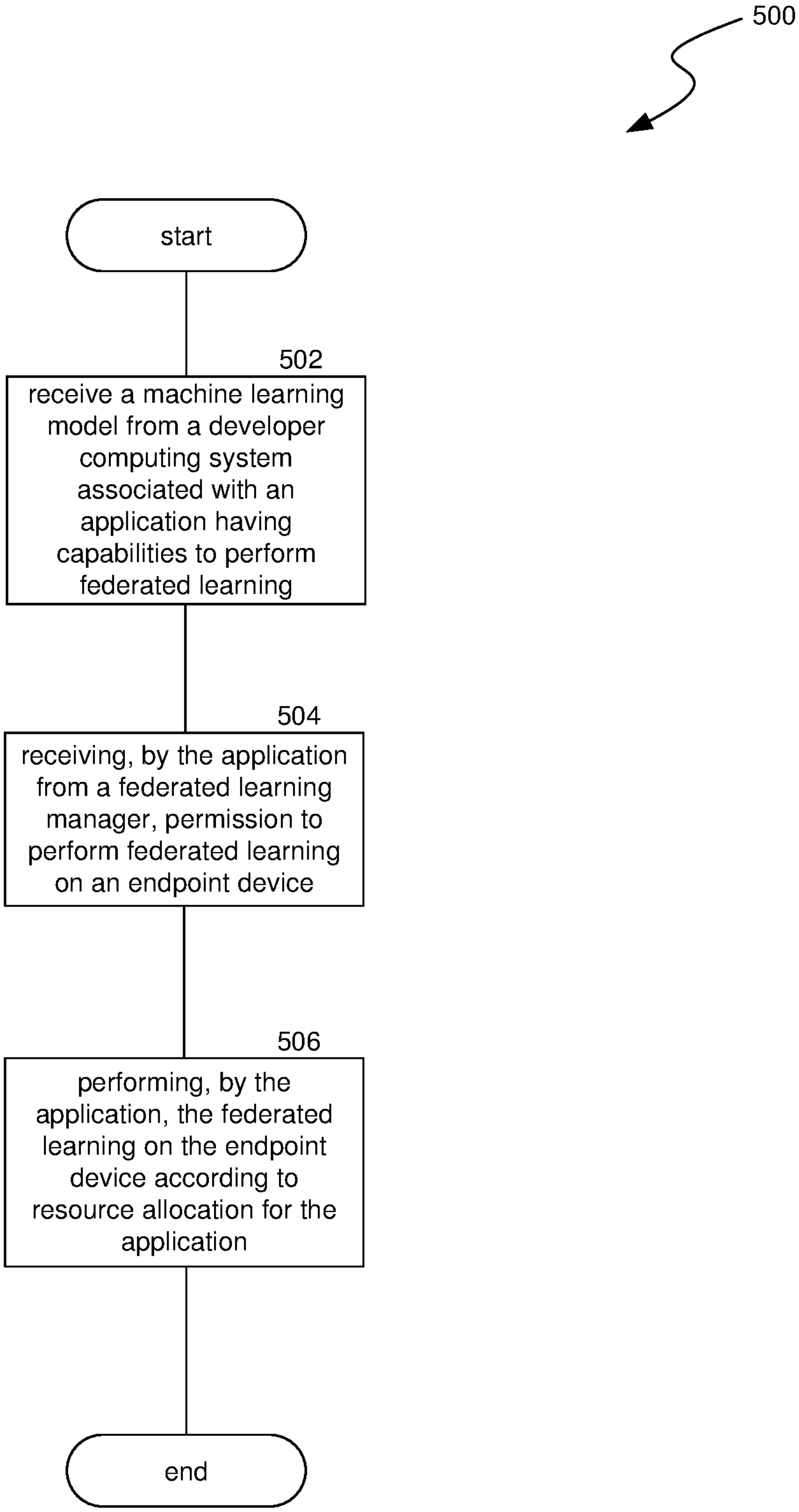
FIG. 5 is a flow diagram illustrating a process used in some implementations for performing federated learning by an application on an endpoint device.

FIG. 5 is a flow diagram illustrating a process 500 used in some implementations for performing federated learning by an application on an endpoint device. In some implementations, process 500 can be performed as a response to a user launching an application having capabilities to perform federated learning. In some implementations, process 500 can be performed as a response to receiving a machine learning model for an application from a developer computing system. In some implementations, process 500 can be performed by an application having capabilities to perform federated learning on an endpoint device. The application can be in communication with a federated learning manager installed on the endpoint device or installed on a central device.

At block 502, process 500 can receive a machine learning model from a developer computing system. The developer computing system can be associated with an application having capabilities to perform federated learning on an endpoint device using the machine learning model. The machine learning model can be trained, prior to receipt at block 502, by the developer computing system on datasets collected by multiple endpoint devices, such as endpoint devices having the application installed thereon. In some implementations, the machine learning model can be trained, prior to receipt at block 502, on updated parameters and/or retrained instances of the machine learning model refined by multiple endpoint devices having the application installed thereon. In some implementations, the machine learning model can be trained at least partially, prior to receipt at block 502, via federated learning, without being exposed to datasets collected by the multiple endpoint devices via the applications. In other words, in some implementations, the machine learning model can be trained on parameters aggregated from the multiple endpoint devices, where the parameters are generated based on the collected datasets.

At block 504, process 500 can receive, by the application from a federated learning manager, permission to perform federated learning on the endpoint device. In some implementations, the federated learning manager can be installed on the endpoint device on which the application is running. In some implementations, the federated learning manager can be installed on a central device in operable communication with the endpoint device, and permission to perform the federated learning can be received via a wired or wireless connection between the endpoint device and the central device (e.g., over network 230 of FIG. 2).

The federated learning manager can control resource allocation to multiple applications, including the application, installed on the same endpoint device or installed across different endpoint devices than the endpoint device on which the application receiving permission to perform the federated learning is installed. In some implementations, the federated learning manager can control resource allocation to the multiple applications based on one or more user controls for performing the federated learning. In some implementations, the one or more user controls for performing the federated learning can be rendered on a user interface dashboard element, such as that shown and described with respect to FIG. 10.

At block 506, process 500 can perform, by the application, the federated learning on the endpoint device according to the resource allocation for the application. The federated learning manager can set the resource allocation for the application based on, for example, one or more metrics related to the performing of the federated learning by the application, such as performance data collected during a previous performance of the federated learning by the application (e.g., how long it took, a percentage of CPU used, an amount of power consumed, etc.). In some implementations, the federated learning manager can collect such metrics during performance of the federated learning at block 506, and can adjust the resource allocation based on the metrics while performing the federated learning, and/or for a later performance of the federated learning.

In some implementations, the federated learning manager can set the resource allocation for the application based on one or more user controls for managing the federated learning. In some implementations, the user controls can be displayed via a user interface dashboard element (e.g., such as that shown and described herein with respect to FIG. 10) on the endpoint device or on a central device. The user controls can specify, for example, whether the application can perform federated learning and in what capacity, when federated learning can be performed by the application, a priority order for the application amongst other applications having capabilities to perform federated learning, a timeslot for performing the federated learning, what types of data can and cannot be collected by the application, etc.

Process 500 can perform the federated learning using data collected at the endpoint device, by generating a retrained instance of the machine learning model using the collected data. In some implementations, in generating the retrained instance of the machine learning model, process 500 can update the parameters, on which the machine learning model was trained, based on the collected data. The collected data can include, for example, user data associated with users using the endpoint devices (e.g., demographics data, household data, etc.), usage data by users of the endpoint devices (e.g., when, for how long, and/or how the endpoint devices are being used), contextual data surrounding usage of the endpoint devices (e.g., time of day or year that the endpoint devices are used, where the endpoint devices are used, etc.), environmental data (e.g., conditions under which the endpoint devices are used, e.g., when there is low ambient light), feedback data on suggestions and/or actions taken based on predictions made by the machine learning model, application usage data, other application-specific data, etc.

Thus, the retrained instance of the machine learning model can be a version of the model refined for the application and/or endpoint device. In some implementations, the retrained instance of the machine learning model can be used to personalize services provided by the application and/or endpoint device, such as to suggest, target, or streamline information, to cause changes in a user's environment (e.g., activate or deactivate IoT devices), etc. Further details regarding applying updating a trained machine learning model are described herein with respect to FIG. 9.

Process 500 can further transmit updated model data to the developer computing system, which can include updated parameters of the machine learning model and/or the retrained instance of the machine learning model. The developer computing system can then update the machine learning model based on the updated model data. In some implementations, the updated model data does not include the data collected by the endpoint device. Thus, the endpoint device can retain control of its collected data, which could be sensitive, personal, or identifying. Nevertheless, the developer computing system can still refine its machine learning model.

In some implementations, process 500 can transmit the updated model data directly to the developer computing system. In some implementations, however, process 500 can transmit the updated model data to the developer computing system via a federated learning tower or other intermediary device or system. The federated learning tower can be, for example, a base station receiving the updated model data, and aggregating the updated model data with other updated model data received from one or more other endpoint devices and/or endpoint device peer ecosystems. In some implementations, the one or more other endpoint devices can be within a threshold distance of the endpoint device, e.g., can be in a same local area as the endpoint device, but outside a local network used by the endpoint device.

In some implementations, process 500 can share selected data with one or more other applications on the endpoint device, with other applications on other endpoint devices (e.g., over a wired or wireless connection between the endpoint device), and/or with a central device (e.g., over a wired or wireless connection between the endpoint device and the central device). In some implementations, the selected data can include at least some of the data collected by the endpoint device while performing federated learning for the application. For example, some applications may use at least some of the same data to retrain their respective machine learning models. In such an example, the endpoint device can collect the data once, then share the collected data amongst one or more other applications. In some implementations, the selected data can include other data relative to performing the federated learning, such as a time duration for performing the federated learning, training data (even if it is not used by other machine learning models or applications), the updated model data (e.g., the updated parameters of the machine learning model and/or the retrained instance of the machine learning model), etc.

In some implementations, process 500 can end when a user or system terminates the application performing the federated learning. In some implementations, process 500 can end when the federated learning is completed or terminated. In some implementations, process 500 can when the endpoint device performing the federated learning is deactivated or powered off.

Figure 6:
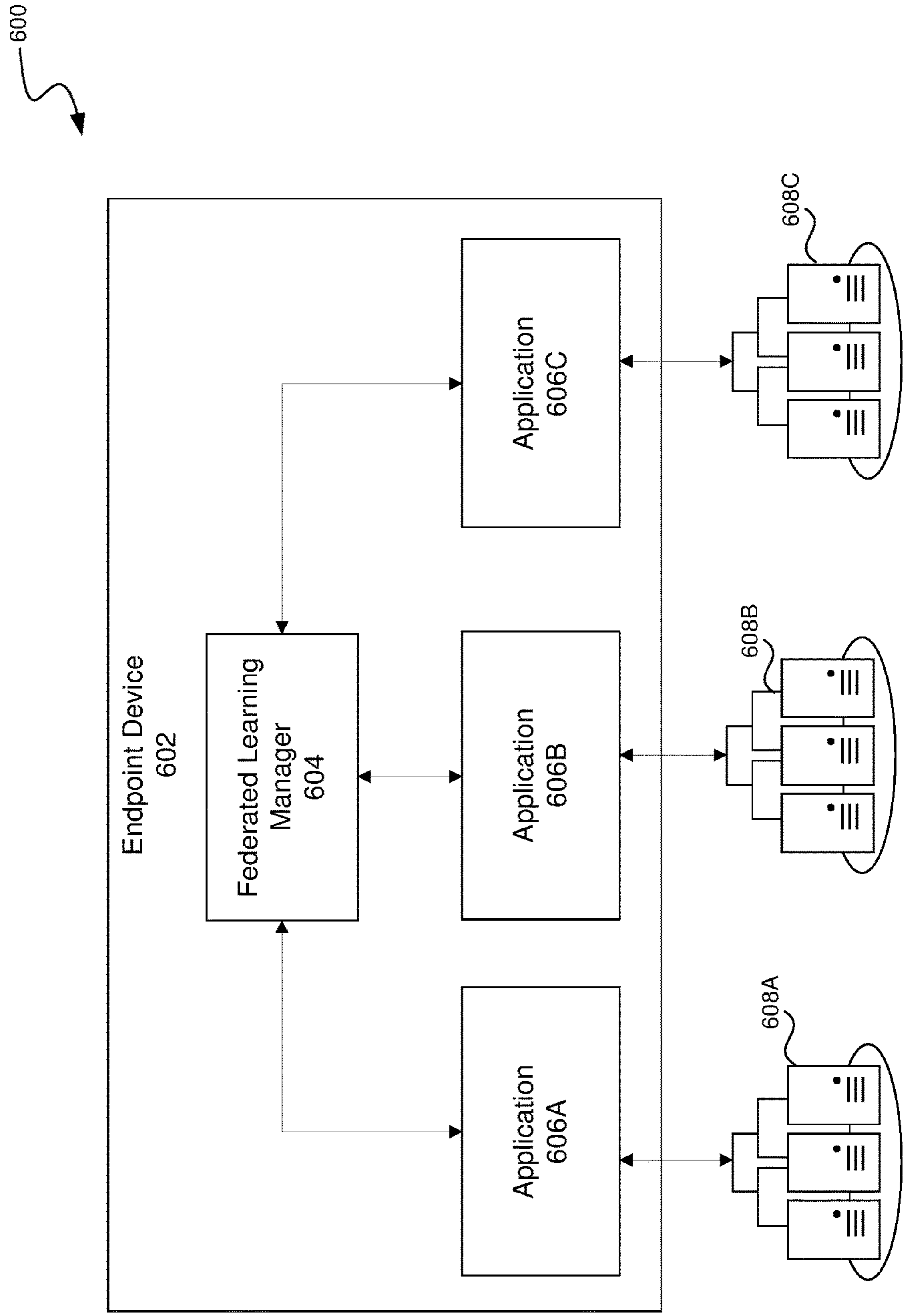
FIG. 6 is a block diagram illustrating a system used in some implementations for managing federated learning being performed by multiple applications on an endpoint device.

FIG. 6 is a block diagram illustrating a system 600 used in some implementations for managing federated learning being performed by multiple applications 606A-C on an endpoint device 602. In exemplary system 600, endpoint device 602 can be a computing device, mobile device, IoT device, smart device, etc. For example, endpoint device 602 can be a smart home hub.

Endpoint device 602 can be in operable communication with developer computing systems 608A-C, such as over a network (e.g., network 230 of FIG. 2). Developer computing systems 608A-C can transmit respective machine learning models to applications 606A-C via endpoint device 602. The machine learning models can be models predicting actions, inactions, behaviors, usage, etc., with respect to applications 606A-C and/or endpoint device 602. Developer computing systems 608A-C can train their respective machine learning models using raw datasets of actions, behaviors, etc. with respect to multiple applications or endpoint devices, using parameters and/or weights of nodes within previous instances of the machine learning model updated by endpoint devices, using previous instances of the machine learning model updated by endpoint devices, etc.

Endpoint device 602 can receive the respective machine learning models from developer computing systems 608A-C, which can be managed by federated learning manager 604. In some implementations, federated learning manager 604 can analyze the machine learning models for features or characteristics to decide how to manage the federated learning requested to be performed. Federated learning manager 604 can control resource allocation to applications 606A-C for performing the federated learning. For example, federated learning manager 604 can restrict, allow, or block the performance of federating learning by applications 606A-C based on, for example, user controls, metrics or other statistics, etc., as described further herein.

Based on the resource allocation designated by federated learning manager 604, applications 606A-C can collect data on endpoint device 602. The collected data can include any data relevant to endpoint device 602 and/or applications 606A-C, as described further herein. For example, endpoint device 602, which can be a smart home hub in this example, can have various applications 606A-C controlling various smart home devices (e.g., smart bulbs, smart thermostats, etc.). Endpoint device 602 can collect information such as which smart home devices are turned on and when, which smart home devices are turned off and when, settings of the smart home devices, where the smart home devices are located, etc., in accordance with the resource allocation specified by federated learning manager 604. Applications 606A-C on endpoint device 602 can use this collected data to update parameters of the machine learning models and/or generate retrained instances of the machine learning models, and transmit this updated model data back to developer computing systems 608A-C, respectively. Thus, developer computing systems 608A-C can update and refine their machine learning models without being exposed to the collected data itself.

Although illustrated and described as endpoint device 602 having three applications 606A-C, it is contemplated that endpoint device 602 can have any number of one of more applications installed thereon, including any number of one or more applications having capabilities to perform federated learning that are managed by federated learning manager 604. Further, although illustrated and described as system 600 including three developer computing systems 606A-C, it is contemplated that two or more of applications 606A-C can be associated with a same developer computing system. Further, it is contemplated that endpoint device 602 can be in operable communication with any number of developer computing systems corresponding to any number of applications installed on endpoint device 602 that are capable of performing federated learning.

Figure 7:
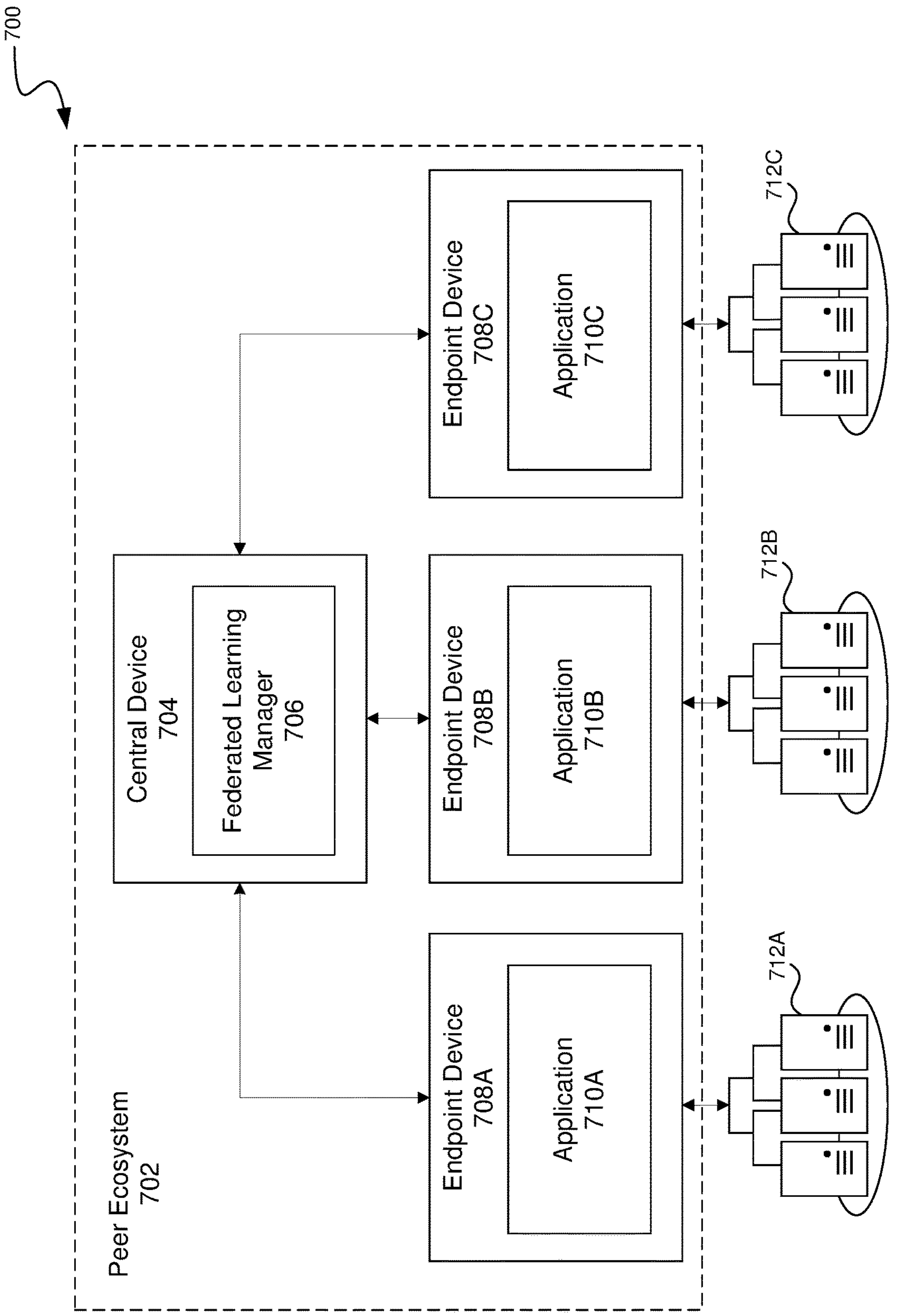
FIG. 7 is a block diagram illustrating a system used in some implementations for managing federated learning, at a central device, being performed by multiple applications on multiple endpoint devices in a peer ecosystem.

FIG. 7 is a block diagram illustrating a system 700 used in some implementations for managing federated learning, at a central device 704, being performed by multiple applications 710A-C on multiple endpoint devices 708A-C in a peer ecosystem 702. In some implementations, central device 704 can be in peer ecosystem 702 with endpoint devices 708A-C, e.g., endpoint devices 708A-C can be in operable communication with central device 704; endpoint devices 708A-C can be in operable communication with each other; and/or endpoint devices 708A-C and central device 704 can all be on the same local network and/or using the same communication protocol (e.g., using the same WiFi connection, communicating via Bluetooth, etc.). In exemplary system 700, endpoint devices 708A-C and central device 704 can include computing devices, mobile devices, IoT devices, smart devices, etc. For example, endpoint device 708A can be a mobile phone, endpoint device 708B can be a tablet, endpoint device 708C can be a smart television and central device 704 can be a computer.

In some implementations, endpoint devices 708A-C can be in operative communication with developer computing systems 712A-C, respectively, such as over a network (e.g., network 230 of FIG. 2). Developer computing systems 712A-C can transmit respective machine learning models to endpoint devices 708A-C, respectively. The machine learning models can be models predicting actions and/or behaviors with respect to applications 710A-C and/or endpoint devices 708A-C. Developer computing systems 712A-C can train their respective machine learning models using raw datasets of actions and/or behaviors with respect to multiple endpoint devices, using parameters and/or weights of nodes within previous instances of the machine learning model updated by endpoint devices, using previous instances of the machine learning model updated by endpoint devices, etc.

Endpoint devices 708A-C can receive the respective machine learning models from developer computing systems 712A-C and notify federated learning manager 706 of their receipt. In some implementations, endpoint devices 708A-C can further provide federated learning manager 706 with features or characteristics of the machine learning models and/or of the federated learning requested to be performed by applications 710A-C, such that federated learning manager 706 can manage the federated learning and retraining of the machine learning models. Federated learning manager 706 can control resource allocation the applications 710A-C and/or apply constraints to the federated learning requested to be performed by applications 710A-C. For example, federated learning manager 706 can restrict, allow, or block the performance of federating learning by applications 710A-C based on, for example, user controls, metrics or other statistics, etc., as described further herein.

Based on the resource allocation designated by federated learning manager 706, applications 710A-C can collect data on endpoint devices 708A-C, respectively. The collected data can include any data relevant to endpoint devices 708A-C and/or applications 710A-C, as described further herein. For example, endpoint device 708A, which can be a mobile phone in this example, can have an internet browser as application 710A, and can collect information such as a type of the mobile phone, a location of the mobile phone, websites accessed via the internet browser, internet searches made on the internet browser, how long particular websites were visited, interactions on the websites, cookies, etc., in accordance with the resource allocation specified by federated learning manager 706. In some implementations, applications 710A-C on endpoint devices 708A-C can use this collected data to update parameters of the machine learning models and/or generate retrained instances of the machine learning models, and transmit this updated model data back to developer computing systems 712A-C, respectively. Thus, developer computing systems 712A-C can update and refine their machine learning models without being exposed to the collected data itself.

Although illustrated and described as endpoint devices 708A-C receiving the machine learning models from developer computing systems 712A-C, collecting data, retraining the machine learning models, and transmitting the updated model data back to developer computing systems 712A-C, it is contemplated that, in some implementations, central device 704 can receive the machine learning models from developer computing systems 712A-C, distribute them to applications 710A-C along with resource allocation for the federated learning, receive the updated model data from applications 708A-C, and/or transmit the updated model data to developer computing systems 712A-C. Further, although illustrated as being separate applications 710A-C associated with separate developer computing systems 712A-C, it is contemplated that applications 710A-C can be different instances of the same application requesting to run instances of the same machine learning model, and can be associated with a single developer computing system.

In some implementations, security communication protocols, privacy levels, data ownership, and/or data editing privileges can be different within peer ecosystem 702, as opposed to outside of peer ecosystem 702 (e.g., in communicating with developer computing systems 712A-C). For example, the data format within a household's WiFi (e.g., a network used within peer ecosystem 702) may not be encrypted for communication to a peer hub (e.g., central device 704) from endpoint devices 708A-C. Conversely, updated model data can be encrypted and/or obfuscated before transmission to developer computing systems 712A-C.

Figure 8:
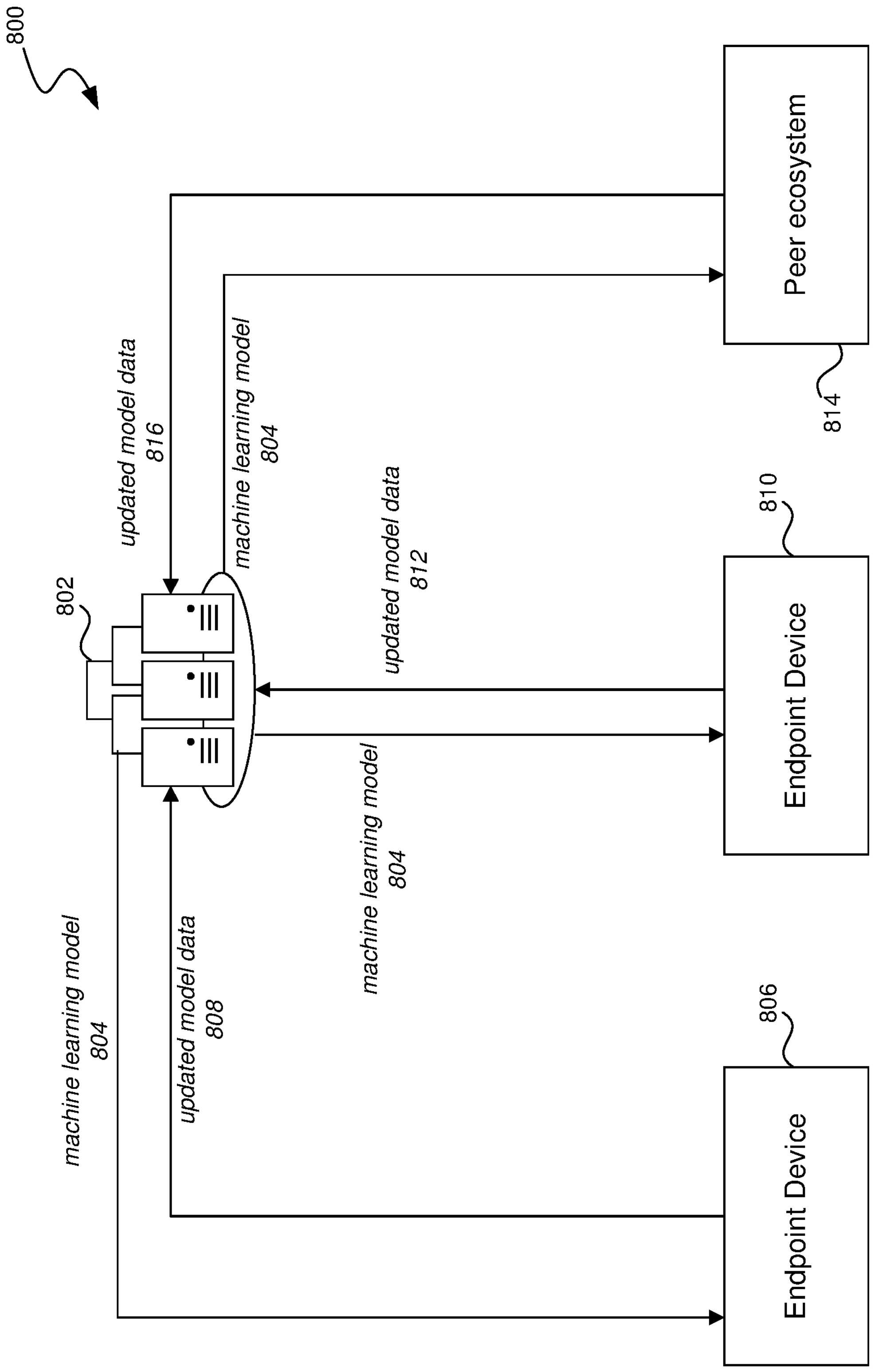
FIG. 8 is a block diagram illustrating a system used in some implementations for providing updated models to a developer computing system associated with an application performing federated learning.

FIG. 8 is a block diagram illustrating a system 800 used in some implementations for providing updated models to a developer computing system 802 associated with an application (not shown) performing federated learning. System 800 can include developer computing system 802 in operable communication with endpoint device 806, endpoint device 810, and peer ecosystem 814, which can all have instances of a same application installed. Developer computing system 802 can provide machine learning model 804 to endpoint device 806, endpoint device 810, and peer ecosystem 814. In some implementations, endpoint device 806 and endpoint device 810 can be similar to endpoint device 602 of FIG. 6, and can collect data and generate updated model data 808 and 812, respectively, according to resource allocation and/or constraints imposed by a federated learning manager (not shown), such as that described further herein. Endpoint devices 806, 810 can transmit updated model data 808, 812, respectively, to developer computing system 802. The updated model data can include updated parameters of machine learning model 804, and/or retrained instances of machine learning model 804.

In some implementations, peer ecosystem 814 can be similar to peer ecosystem 702 of FIG. 7. In some implementations, as described with respect to FIG. 7, one or more endpoint devices of peer ecosystem 814 can receive machine learning model 804, collect data, and generate updated model data 816, according to resource allocation and/or constraints imposed by a federated learning manager (not shown) on a central device, such as central device 704 of FIG. 7. In some implementations, however, the central device of peer ecosystem 814 can receive machine learning model 804 and distribute it to one or more endpoint devices within peer ecosystem 814. The one or more endpoint devices can receive machine learning model 804, collect data, and generate individual instances of updated model data that are provided to the central device. In some implementations, the central device can aggregate the individual instances of updated model data to generate aggregated updated model data 816, and transmit aggregated updated model data 816 to developer computing system 802. The updated model data can include updated parameters of machine learning model 804, and/or the retrained instance of machine learning model 804.

In still other implementations, the central device of peer ecosystem 814 can receive machine learning model 804, and provide instructions to one or more endpoint devices to collect data relevant to machine learning model 804. The one or more endpoint devices can collect the data and transmit it to the central device. The central device can aggregate the collected data from the one or more endpoint devices, and retrain machine learning model 804 to generate updated model data 816. The central device can then transmit updated model data 816 to developer computing system 802, which can include updated parameters of machine learning model 804, and/or the retrained instance of machine learning model 804.

Figure 9:
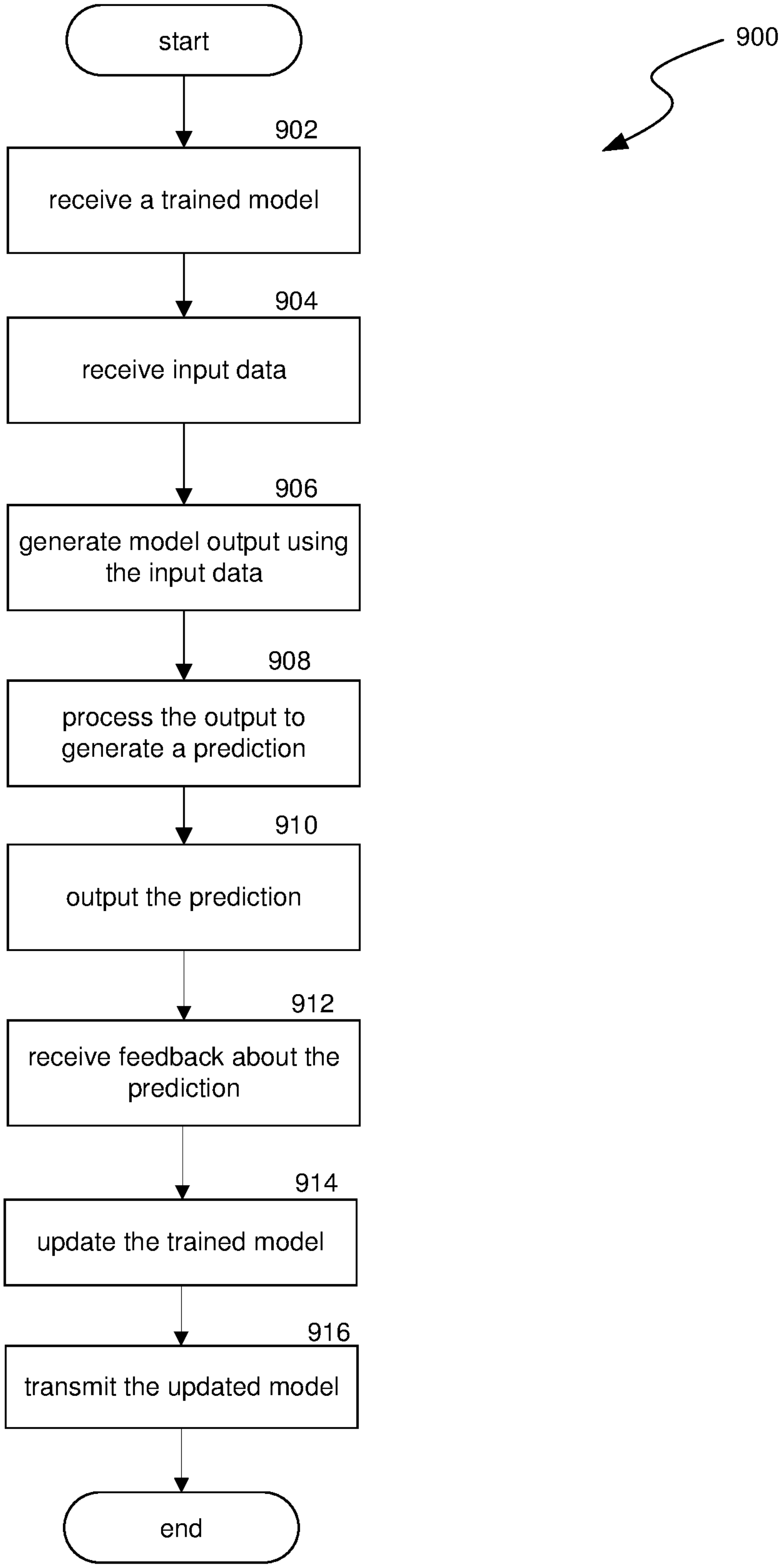
FIG. 9 is a flow diagram illustrating a process used in some implementations for locally applying and updating a trained model according to some implementations of the present technology.

FIG. 9 is a flow diagram illustrating a process 900 used in some implementations for locally applying and updating a trained model according to some implementations of the present technology. In some implementations, process 900 can be performed as a response to receipt of a trained model, e.g., a machine learning model and/or a retrained instance of a machine learning model, as described further herein. In some implementations, some or all of process 900 can be performed by an endpoint device. In some implementations, some or all of process 900 can be performed by a central device, such as when the central device aggregates updated model data from multiple endpoint devices, as described further herein.

At block 902, process 900 can receive a trained model (e.g., a machine learning model and/or a retrained instance of a machine learning model, as described herein). In some implementations, the received model can be initially trained by a developer computing system using machine learning models and/or parameters for machine learning models that are generated and/or revised by endpoint devices. In some implementations, the developer computing system can train the initial model on actual datasets received from endpoint devices. For example, the developer computing system can map the features of the datasets and/or the parameters of received machine learning models into a classification space identifying known actions (or inactions) made with respect to particular types of endpoint devices and/or particular applications. In some implementations, process 900 can receive a retrained instance of a machine learning model, as when process 900 is performed iteratively.

At block 904, process 900 can receive input data. In some implementations, the input data can be data collected from one or more endpoint devices. The input data can include, for example, user data (e.g., data specific to a user of an endpoint device or application, such as who accessed the endpoint device or application, demographics of the user, habits of the user, etc.), usage data (e.g., when and how the endpoint device or an application was used), peer ecosystem data (e.g., demographics data for users of multiple locally networked devices in the ecosystem, e.g., a household, such as location of the household, how many people are in the household, demographics of the household, etc.), environmental data (e.g., data collected from sensors, such as ambient light level, noise level, temperature, etc.), other application-specific data (e.g., features of the application that were accessed, how long those features were accessed, interactions with particular features, etc.), and/or the like. In some implementations, process 900 can further receive and/or obtain contextual factors surrounding usage of the endpoint device or application, such as time of the day, time of the year, season, weather, where the endpoint device or application was used, other actions being taken when the endpoint device or application was being used, other applications that were being used, etc.

At block 906, process 900 can generate a model output using the input data and the trained model. In some implementations, process 900 can further generate the model output using any contextual factors. In some implementations, based on the input data, process 900 can extract relevant features from the input data and map the features as data points to an output vector in the classification space created using the training data.

At block 908, process 900 can process the model output to generate a predicted action to take and/or that will be taken by an endpoint device or application based on the input data. In some implementations, process 900 can generate a match score between the output (i.e., the mapped features of the input data) and the features of candidate actions in the classification space by calculating a distance between the output and the candidate actions. The match score can be any numerical or textual value or indicator, such as a statistic or percentage. Process 900 can identify the predicted action based on, for example, the candidate action having the highest match score to the output.

At block 910, process 900 can output the prediction. In some implementations, process 900 can output the predicted action by causing an application or endpoint device to perform the predicted action. In some implementations, process 900 can output the predicted action by audibly announcing the predicted action (e.g., a virtual assistant on a smart speaker asking, "It's 9:00 AM, do you want to hear the weather?"). In some implementations, process 900 can output the predicted action by visually displaying the predicted action (e.g., a smart television displaying a prompt to change the channel to view the user's most frequently watched show).

At block 912, process 900 can receive feedback about the predicted action. In some implementations, the feedback can be explicit, e.g., the user selects to perform a suggested action, the user declines to perform the suggested action, the user audibly confirms that the predicted action is correct, the user audibly announces the predicted action is incorrect and/or identifies the correct action, the user selects a virtual or physical button indicating that the predicted action is correct or incorrect, etc. In some implementations, the feedback can be implicit, e.g., the user does not correct implementation of the predicted action. The user can provide feedback by the same or a different endpoint device by which the predicted action was output, or via a central device.

At block 914, process 900 can update the trained model. For example, process 900 can use the feedback data to identify whether the predicted action was correct or incorrect (and if incorrect, what the correct action or inaction was, e.g., by observing the user's behavior with respect to the endpoint device after the action was predicted), and use that information as a comparison factor to update the model and/or the classification space. In some implementations, process 900 can weigh the current training data more heavily than the initial or past training data, as the later training data can be considered more relevant and/or accurate. Although illustrated as a single process 900 in FIG. 9, it is contemplated that process 900 can be performed multiple times and/or repeatedly, either consecutively or concurrently, as additional input data is received.

At block 916, process 900 can transmit the trained model. In some implementations, process 900 can transmit the trained model to the developer computing system from which the trained model was received at block 902. In some implementations, process 900 can transmit the trained model to the developer computing system via a central device. Process 900 can transmit the trained model via any suitable network, such as network 230 of FIG. 2, which can be the same or a different network from which process 900 received the trained model at block 902.

Some implementations of the federated learning described herein can include a machine learning component, such as a neural network, that is trained using a variety of data, including known input data, known actions, past actions taken by the user or similar users, user data, contextual factors, and whether the user identified a predicted action as correct or incorrect. Some implementations can feed input data including user data, usage data, environmental factors, etc., and any contextual factors into the trained machine learning component, and based on the output, can generate a predicted action. Some implementations can provide this predicted action to a user via a display, an audible announcement, and/or by causing an endpoint device or application to perform the action automatically. Some implementations can receive feedback about the predicted action to further enhance the trained model.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the trained model can be a neural network with multiple input nodes that receive input data including user data, usage data, environmental data, etc., and any contextual factors. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to predict an action to take with respect to an endpoint device. In some implementations, such neural networks, known as deep neural networks, can have multiple layers of intermediate nodes with different configurations, can be a combination of models that receive different parts of the input and/or input from other parts of the deep neural network, or are convolutions or recurrent-partially using output from previous iterations of applying the model as further input to produce results for the current input.

A machine learning model can be trained with supervised learning, where the training data includes known input data, known actions, and any contextual factors as input and a desired output, such as a prediction of an action. Current input data collected by one or more locally networked endpoint devices can be provided to the model. Output from the model can be compared to the desired output for that input data, and, based on the comparison, the model can be modified, such as by changing weights between nodes of the neural network or parameters of the functions used at each node in the neural network (e.g., applying a loss function). After applying each of the factors in the training data and modifying the model in this manner, the model can be trained to evaluate new input data.

Some implementations of the federated learning described herein can include a deep learning component. A "deep learning model," as used herein, refers to a construct trained to learn by example to perform classification directly from input data. The deep learning model is trained by using a large set of labeled data and applying a neural network as described above that includes many layers. The deep learning model in some implementations can be a convolutional neural network (CNN) that is used to automatically learn input data's inherent features to identify a predicted action. For example, the deep learning model can be an R-CNN, Fast R-CNN, or Faster-RCNN.

Figure 10:
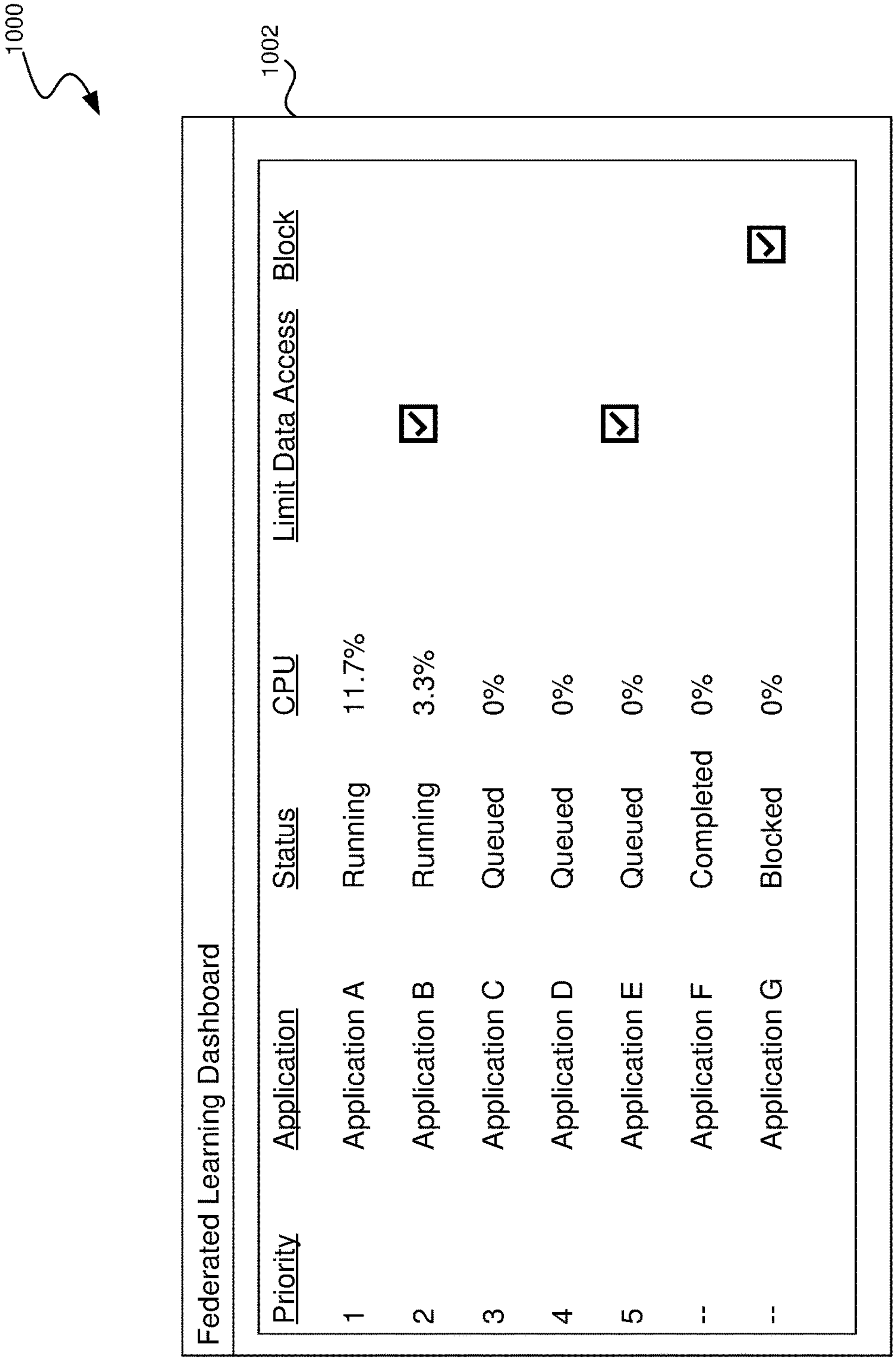
FIG. 10 is a conceptual diagram illustrating an example view of a user interface dashboard element for a federated learning manager presented on an endpoint device or central device.

FIG. 10 is a conceptual diagram illustrating an example view 1000 of a user interface dashboard element 1002 for a federated learning manager presented on an endpoint device or central device (not shown). User interface dashboard element 1002 can include various data, statuses, metrics, options, user controls, etc., that can be visualized and/or modified to control resource allocation to applications capable of performing federated learning. For example, user interface dashboard element 1002 can include information, metrics, and/or user controls including: a list of applications, a priority order for the applications to perform federated learning, a status of federated learning on the applications, a CPU percentage being used by the application to perform federated learning, an option to limit data access by a particular application when performing federated learning, and an option to block an application from performing federated learning.

In some implementations, a user viewing user interface dashboard element 1002 can change the priority order of applications requesting to perform federated learning, can specify what types or how much data can be used or collected when performing federated learning, and/or can prevent or stop certain applications from performing federated learning. In some implementations in which example view 1000 is displayed on a central device, user interface dashboard element 1002 can further specify which endpoint devices have which applications requesting to perform federated learning, and/or can provide information, metrics, statistics, resource availability, etc., for particular endpoint devices. Although shown as user interface dashboard element 1002 providing particular pieces of information and user controls relative to applications and performance of federating learning, it is contemplated that user interface dashboard element 1002 can alternatively or additionally include other data relative to federated learning, machine learning models, collected data, endpoint devices, applications, etc., as described herein.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for managing federated learning by multiple applications on multiple endpoint devices, the method comprising:

managing multiple machine learning models received from respective developer computing systems, each of the developer computing systems being associated with an individual application of the multiple applications, the multiple applications having programming to perform federated learning on the one or more endpoint devices, using respective machine learning models, wherein each machine learning model, of the multiple machine learning models, is trained on parameters aggregated from the multiple endpoint devices, the parameters being generated based on one or more local datasets collected by a respective one of the individual applications, installed on a respective endpoint device of the multiple endpoint devices;

controlling resource allocation to the multiple applications having the programming to perform the federated learning on the one or more endpoint devices, wherein controlling the resource allocation includes selecting a subset of the multiple applications to perform the federated learning, and the subset of the applications, of the multiple applications, perform the federated learning by generating retrained instances of respective machine learning models using data collected by the one or more endpoint devices; and rendering a user interface dashboard element, the user interface dashboard element providing one or more user controls for managing the federated learning;

wherein the user interface dashboard element presents application-specific federated learning participation controls, wherein each individual application, of the selected subset of the multiple applications, has a separate federated learning task definition and separate model parameters, and wherein the resource allocation is performed for each individual application.

2. The method of claim 1, wherein controlling resource allocation to the multiple applications includes assigning timeslots for performing the federated learning to the multiple applications.

3. The method of claim 1, wherein the data is collected once, per instance of generating retrained instances of respective machine learning models, by the one or more locally networked endpoint devices for the subset of the multiple applications.

4. The method of claim 1, further comprising:

providing one or more communication paths for communicating selected data between the multiple applications, the selected data including at least one of training time, training data, the retrained instances of respective machine learning models, or any combination thereof.

5. The method of claim 1, further comprising:

obtaining metrics related to the performing of the federated learning by the subset of applications.

6. The method of claim 5, further comprising:

adjusting the resource allocation based, at least partially, on the metrics related to the performing of the federated learning.

7. The method of claim 5, wherein the user interface dashboard element further identifies the metrics related to the performing of the federated learning.

8. The method of claim 1, further comprising:

adjusting the resource allocation based, at least partially, on the one or more user controls for managing the federated learning.

9. The method of claim 8, wherein adjusting the resource allocation based on the one or more user controls for managing the federated learning includes blocking an application, of the subset of applications, from performing the federated learning.

10. The method of claim 1, wherein controlling resource allocation to the multiple applications is based, at least partially, on at least one of an application priority order, respective capabilities of the one or more endpoint devices, respective statuses of the one or more endpoint devices, available time for the multiple applications to perform the federated learning, or any combination thereof.

11. The method of claim 10, wherein the application priority order is established based on user activities with respect to the multiple applications.

12. A computer-readable storage medium storing instructions that, when executed by a computing system, cause the computing system to perform a process for managing federated learning by multiple applications on multiple endpoint devices, the process comprising:

managing multiple machine learning models received from respective developer computing systems, each of the developer computing systems being associated with an individual application of the multiple applications, the multiple applications having programming to perform federated learning on the one or more endpoint devices, using respective machine learning models, wherein each machine learning model, of the multiple machine learning models, is trained on parameters aggregated from the multiple endpoint devices, the parameters being generated based on one or more local datasets collected by a respective one of the individual applications, installed on a respective endpoint device of the multiple endpoint devices;

controlling resource allocation to the multiple applications having the programming to perform the federated learning on the one or more endpoint devices, wherein controlling the resource allocation includes selecting a subset of the multiple applications to perform the federated learning, and the subset of the applications, of the multiple applications, perform the federated learning by generating retrained instances of respective machine learning models using data collected by the one or more endpoint devices; and rendering a user interface dashboard element, the user interface dashboard element providing one or more user controls for managing the federated learning;

wherein the user interface dashboard element presents application-specific federated learning participation controls, wherein each individual application, of the selected subset of the multiple applications, has a separate federated learning task definition and separate model parameters and wherein the resource allocation is performed for each individual application.

13. The computer-readable storage medium of claim 12, wherein the process further comprises:

obtaining metrics related to the performing of the federated learning by the subset of applications.

14. The computer-readable storage medium of claim 13, wherein the process further comprises:

adjusting the resource allocation based, at least partially, on the metrics related to the performing of the federated learning.

15. The computer-readable storage medium of claim 13, wherein the user interface dashboard element further identifies the metrics related to the performing of the federated learning.

16. A computing system for managing federated learning by multiple applications on one or more endpoint devices, the computing system comprising:

one or more processors; and one or more memories storing instructions that, when executed by the one or more processors, cause the computing system to perform a process comprising:

managing multiple machine learning models received from respective developer computing systems, each of the developer computing systems being associated with an individual application of the multiple applications, the multiple applications having programming to perform federated learning on the one or more endpoint devices, using respective machine learning models, wherein each machine learning model, of the multiple machine learning models, is trained on parameters aggregated from the multiple endpoint devices, the parameters being generated based on one or more local datasets collected by a respective one of the individual applications, installed on a respective endpoint device of the multiple endpoint devices;

controlling resource allocation, to the multiple applications having the programming to perform the federated learning on the one or more endpoint devices, by selecting a subset of the multiple applications to perform the federated learning, and the subset of the applications, of the multiple applications, perform the federated learning by generating retrained instances of respective machine learning models using data collected by the one or more endpoint devices; and rendering a user interface, the user interface providing one or more controls for managing the federated learning;

wherein the user interface presents application-specific federated learning participation controls, wherein each individual application, of the selected subset of the multiple applications, has a separate federated learning task definition and separate model parameters, and wherein the resource allocation is performed for each individual application.

17. The computing system of claim 16, wherein controlling resource allocations to the multiple applications includes assigning timeslots for performing the federated learning to the multiple applications.

18. The computing system of claim 16, wherein the process further comprises:

providing one or more communication paths for communicating selected data between the multiple applications, the selected data including at least one of training time, training data, the retrained instances of respective machine learning models, or any combination thereof.

19. The computing system of claim 16, wherein controlling resource allocation to the multiple applications is based, at least partially, on at least one of an application priority order, respective capabilities of the one or more endpoint devices, respective statuses of the one or more endpoint devices, available time for the multiple applications to perform the federated learning, or any combination thereof.

20. The computing system of claim 19, wherein the application priority order is established based on user activities with respect to the multiple applications.

* * * * *